(12) United States Patent  
Small et al.

(10) Patent No.: US 8,699,671 B2
(45) Date of Patent: *Apr. 15, 2014

(54) NETWORK TO ALARM PANEL SIMULATOR FOR VOIP

(71) Applicant: AT&T Intellectual Property I, L.P., Reno, NV (US)

(72) Inventors: David B. Small, Dublin, CA (US); Steve Wollmershauser, San Antonio, TX (US); Yolius Diroo, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/846,189

(22) Filed: Mar. 18, 2013

(65) Prior Publication Data

US 2013/0216028 A1    Aug. 22, 2013

Related U.S. Application Data

(63) Continuation of application No. 12/832,719, filed on Jul. 8, 2010, now Pat. No. 8,401,153, which is a continuation of application No. 11/171,615, filed on Jun. 30, 2005, now Pat. No. 7,778,394.

(51) Int. Cl.
*H04M 11/00*    (2006.01)

(52) U.S. Cl.
USPC .......................................... 379/37; 379/93.05

(58) Field of Classification Search
USPC .......................... 379/46, 37, 33, 93.05, 413.04
See application file for complete search history.

(56) References Cited

U.S. PATENT DOCUMENTS

| | | | |
|---|---|---|---|
| 4,922,529 A | 5/1990 | Kiel | |
| 5,592,529 A | 1/1997 | Linsker | |
| 5,923,731 A | 7/1999 | McClure | |
| 6,198,745 B1 | 3/2001 | Brodigan | |
| 6,218,930 B1 | 4/2001 | Katzenberg et al. | |
| 6,226,357 B1 | 5/2001 | Pildner | |
| 6,441,723 B1 | 8/2002 | Mansfield, Jr. et al. | |
| 6,452,923 B1 | 9/2002 | Gerzberg et al. | |
| 6,553,100 B1 | 4/2003 | Chen et al. | |
| 6,690,675 B1 | 2/2004 | Kung et al. | |
| 6,731,749 B1 | 5/2004 | Sacca et al. | |
| 6,822,555 B2 | 11/2004 | Mansfield, Jr. et al. | |
| 6,850,601 B2 | 2/2005 | Jones, III et al. | |
| 7,009,510 B1 | 3/2006 | Douglass et al. | |
| 7,012,994 B2 | 3/2006 | Jung | |
| 7,015,806 B2 | 3/2006 | Naidoo et al. | |
| 7,778,394 B2 * | 8/2010 | Small et al. .................... 379/37 |

(Continued)

*Primary Examiner* — Stella Woo
(74) *Attorney, Agent, or Firm* — Jackson Walker L.L.P.

(57) ABSTRACT

The present invention provides for a system and method for providing a signal to a communication system comprising an interface between a communication link and the communication system, like an alarm system, wherein the interface receives a signal from the communication link and provides a signal indicative of the availability of the communication link for use by the communication system. Alarm systems operations may be facilitated so that Residential Gateway components (such as voice terminal adapters) may simulate traditional telephone network systems that run on 48 VDC powered telephone lines. The system also comprises an input port associated with the interface for receiving the signal from the communication link, a transformer or a voltage regulator and an output port associated with the interface for providing the conditioned signal to the communication system. A ring voltage received from the communication link may be passed through to the alarm system.

19 Claims, 6 Drawing Sheets

(56) References Cited

U.S. PATENT DOCUMENTS

| | | |
|---|---|---|
| 8,401,153 B2 * | 3/2013 | Small et al. .................. 379/37 |
| 2002/0027927 A1 | 3/2002 | Barzegar et al. |
| 2005/0128941 A1 | 6/2005 | Barzegar et al. |
| 2005/0229016 A1 | 10/2005 | Addy |
| 2006/0022816 A1 | 2/2006 | Yukawa |
| 2006/0067484 A1 | 3/2006 | Elliot et al. |
| 2006/0188266 A1 | 8/2006 | Vrla et al. |
| 2007/0127715 A1 | 6/2007 | Binder et al. |

* cited by examiner

NETWORK TO ALARM PANEL SIMULATOR FOR VOIP

The present patent application is a continuation of U.S. patent application Ser. No. 12/832,719, filed Jul. 8, 2010; which is a continuation of U.S. patent application Ser. No. 11/171,615 (now U.S. Pat. No. 7,778,394), filed Jun. 30, 2005, the entirety of which are both hereby incorporated by reference.

FIELD OF THE INVENTION

The present invention relates in general to the field of security systems in a telecommunications network. In particular, the present invention relates to a method and apparatus for power and information management in an auxiliary alarm system linked to a Voice over Internet protocol (VoIP) over any access network including Fiber to the Premises (FTTP), Fiber to the Node, DSL, or Broadband type network.

DESCRIPTION OF THE RELATED ART

Security systems operate by delivering a signal from a home or business to local officials (i.e. local police, security agency, medical unit, etc.) in the event of an emergency. The signal is delivered over an established channel, typically over the phone connection. The power to operate some of these security systems is drawn from conventional (110/120 V AC typical) commercial power sources. The voltage potential on the Service Provider's POTS (Plain Old Telephone Service) is simply for powering the voice communication path from the security system to the telephone company network. Thus, a security system is fully functional whenever the phone connection is intact but leaves the premises vulnerable when the phone connection is lost. In anticipation of this situation, current security systems are designed to detect the occurrence of a lost phone connection by reacting to the loss of power on the POTS line. If power is lost or a phone connection is cut, the security system typically alerts the resident through a pre-programmed mechanism, such as emitting an audio signal or flashing a light-emitting diode. Additionally, alarm systems may 'check-in' with monitoring services twice a day, and will not initiate check-ins if a telephone line is not present, or the alarm doesn't sense the availability of a telephone line to use for check-in.

In traditional phone networks, an electrical signal travels from a central office over copper wires connecting to phone termination points, such as a network interface device (NID) at a home or business. New advances in telephony now provide the ability to transmit telephone signals using light signals sent over fiber optic cable rather than as electrical signals sent over copper cable. Although fiber optic cable is commonly used for transmission over large distances, optical signals are generally converted to electrical signals before arriving at the termination point. At present, there is a movement in the industry to provide Fiber to the Premises (FTTP) connections, i.e. an optical connection all the way to the NID. In addition to FTTP, there is a novel field of telephone communications, exemplified by Voice over Internet Protocol (Voice over IP, or VoIP) and Voice over Asynchronous Transfer Mode (Voice over ATM, or VoATM) which transfers signals using different methods than traditional phone connections. The new access architectures that utilize VoATM/FTTP and VoIP alter how voice service has traditionally been delivered in order to maintain a transparent migration to newer technologies.

In the newer forms of communications, it is possible for customer premises equipment connected to the alarm system not to have line power (−48 volts DC or another signal condition representing the availability of a 'dial tone' or otherwise enabling alarm system operation) on the POTS line. Because the alarm system conditions are not as expected without the presence of the expected signal, the alarm system will not "call out" to an alarm monitoring service. For example, many alarm systems are set up to call out to an alarm monitoring service twice a day for verification purposes, but to delay calling out if phone service is unavailable. The absence of 48VDC (or other enabling signal) input to an alarm panel is a condition that can delay the call out. However, the newer communications equipment are still functionally able to call out, but the alarm panel will not call out since the expected input signal from the communication components is lacking. The alarm system thinks the phone is off hook or in use when the 48V is missing. Thus the alarm waits for call out for the twice a day check-in. The presence of −48 volts DC power on the system is a condition such that the alarm system knows operations are enabled. Because new customer premises equipment may not provide proper signaling conditions to legacy alarm systems, there is a need for an apparatus or method for alarm systems to provide proper conditions to enable normal operation of a phone network alarm connections in newer generation telephone architecture, such as exemplified by VoIP, FTTP and other residential gateway communication system components.

SUMMARY OF THE INVENTION

The present invention provides for a system and method for providing a signal to a communication system comprising an interface between a communication link and the communication system, like an alarm system, wherein the interface receives a signal from the communication link and provides a signal indicative of the availability of the communication link for use by the communication system. Alarm systems operations may be facilitated so that Residential Gateway components (such as voice terminal adapters) may simulate traditional telephone network systems that run on 48 VDC powered telephone lines. The system also comprises an input port associated with the interface for receiving the signal from the communication link, a transformer or a voltage regulator and an output port associated with the interface for providing the conditioned signal to the communication system. A ring voltage received from the communication link may be passed through to the alarm system.

The present invention provides a method and apparatus for an adjustable transformer to provide voltage to customer premises equipment such as an alarm system at the customer premises in association with a VoIP or Fiber to the Premises (FTTP) telephone network. The present invention facilitates alarm systems operations so that alarm systems attached to Residential Gateway components (such as voice terminal adapters), instead of traditional telephones, will function in a manner similar to traditional telephone network systems that run on 48 VDC powered telephone lines. Generally, a local telephone company provides voltage over a telephone communication link. This power, about −48VDC, is commonly used to power the communication links, to keep copper wire free of corrosion and moisture. Alarm panels sense this 48V to determine the phone lines' availability, thereby enabling security systems to communicate with local officials or other monitoring agencies in case of burglary, fire, medical emergency, etc. The VoIP or FTTP network may comprise an optical or electronic connection providing digital signals, such as voice or data, to the premises over one or more circuits, which may be virtual circuits. However, VoIP and FTTP communication-related equipment provide the 48VDC to alarm panels typically used to enable normal operation of the alarm system. VoIP and FTTP communication equipment may provide a different voltage or even no voltage. In an embodiment of the present invention, a voltage relating to equipment comprising a communication link is monitored at the customer premises, for example a voice terminal adapter or other component of a residential gateway. If at least one of the voltages related to a network terminal or residential gateway component is different than the voltage necessary for the proper functioning of an alarm panel, the voltage to the alarm panel is transformed by an adjustable transformer to an expected or necessary voltage to enable alarm system operation, for example 48VDC, thereby ensuring proper operation of the alarm system.

In one aspect of the invention a method is provided for providing voltage to customer premises equipment (CPE), comprising obtaining at least one voltage, or absence of voltage, related to a communication link. A communication link may be a voice terminal adapter (ATA) for VoIP or FTTP. The communication link may provide voltage to the CPE based on the voltage expected or required to be present for proper operation of the CPE, which may be 48V provided to an alarm panel. In another aspect of the invention the communication link comprises a Fiber to the Premises (FTTP) link. In another aspect of the invention the communication link comprises a voice over interne protocol (VoIP) link. In another aspect a voltage related to a network terminal is obtained from communication related equipment and a voltage related to an alarm panel is provided. In another aspect of the invention providing voltage further comprises transforming voltage or the lack of any voltage from a network terminal device to a voltage expected for an alarm panel. In another aspect of the invention a required voltage is provided to an alarm system directly from a transformer. In another aspect of the device a local power source is provided to the transformer. In another aspect of the invention the alarm system notifies an outside emergency unit. In another aspect of the invention, an apparatus is provided for selectively providing voltage to customer premises equipment (CPE) comprising an adjustable transformer obtains a voltage from communications equipment.

BRIEF DESCRIPTION OF THE FIGURES

Objects and features of the present invention will become apparent from the following detailed description considered in connection with the accompanying drawings disclosing embodiments of the present invention. It should be understood, however, that the drawings are designed for the purpose of illustration only and not as a definition of the limits of the invention. For a detailed understanding of the present invention, references should be made to the following detailed description of an exemplary embodiment, taken in conjunction with the accompanying drawings, in which like elements have been given like numerals in the drawings, wherein similar reference characters denote similar elements throughout the several views.

While the invention will be described in connection with its preferred embodiments, it will be understood that the invention is not limited thereto. It is intended to cover all alternatives, modifications, and equivalents that may be included within the spirit and scope of the invention, as defined by the appended claims.

DETAILED DESCRIPTION OF THE INVENTION

In view of the above, the present invention through one or more of its various aspects and/or embodiments is presented to provide one or more advantages, such as those noted below. The present invention provides for the proper operation of alarm systems connected to ATAs when the ATAs do not provide an enabling signal to an alarm panel.

Legacy alarm systems are designed so that event-monitoring systems are wired in series with, for example, a house burglar/fire alarm system powered by the telephone network. The house telephones are then wired behind the alarm system. The voltage designed for these systems to ensure proper operation has been 48VDC, or a range of voltage around 48VDC, though the methods and apparatus provided by the present invention is not limited to any particular voltage or range of voltage.

The present invention provides an adjustable transformer to simulate network to alarm panel for VoIP, FTTP or other communication links. The transformer is adjustable, either by adjusting the length of coils, or by rotating different coils into proximity. The transformer is designed to "step-up" (or "step-down") the voltage coming out of the ATA or FTTP MTU-ONT (powered by the backup battery) to 48 VDC. This invention works with legacy alarm panels such as the public switched telephone network (PSTN) working with new network technologies such as FTTP and VoIP. The present invention may supply a voltage even if the ATA or other residential gateway equipment doesn't supply a voltage.

Many alarm panels, today, expect to receive or "see"+ 48VDC, which indicates that the telephone network is present (e.g., the legacy PSTN). When the 48VDC is present the alarm panel knows the telephone line is available to provide the capability of communicating signals to the alarm monitoring company. With the emergence technology such as VoIP and FTTP the 48VDC may not be present, and so the expected voltage will not be delivered and therefore the alarm panels will not function. The present invention provides for adjusting the output of an ATA or other residential gateway communication component or for simulating a legacy network by supplying a voltage (that is, actually supplying the necessary voltage to enable alarm system operation) if components do not supply a proper voltage.

In a VoIP environment without the advantages provided by the present invention, the alarm panels may only see the often much lower (or absent) voltage output by the ATA. In an FTTP environment voltage may only be present for "ringing." ATAs will output a ringing voltage, which may be in the range of 60 to 100 VDC. Therefore, when the ATA does not provide adequate voltage the transformer provided by this invention may require local powering, either from an uninterruptible power supply (UPS) battery or the ATA interface.

The present invention provides a new type of transformer that will step-up existing low voltage, and in the case of FTTP systems will provide the appropriate powering levels that will feed the alarm panels. Additionally, the present invention provides for sensing an "off-hook" condition (a short, which is generated for example when a house telephone is in use). Upon sensing an off-hook condition the present invention provides for dropping or turning off the voltage to the alarm panel.

Figure 1:
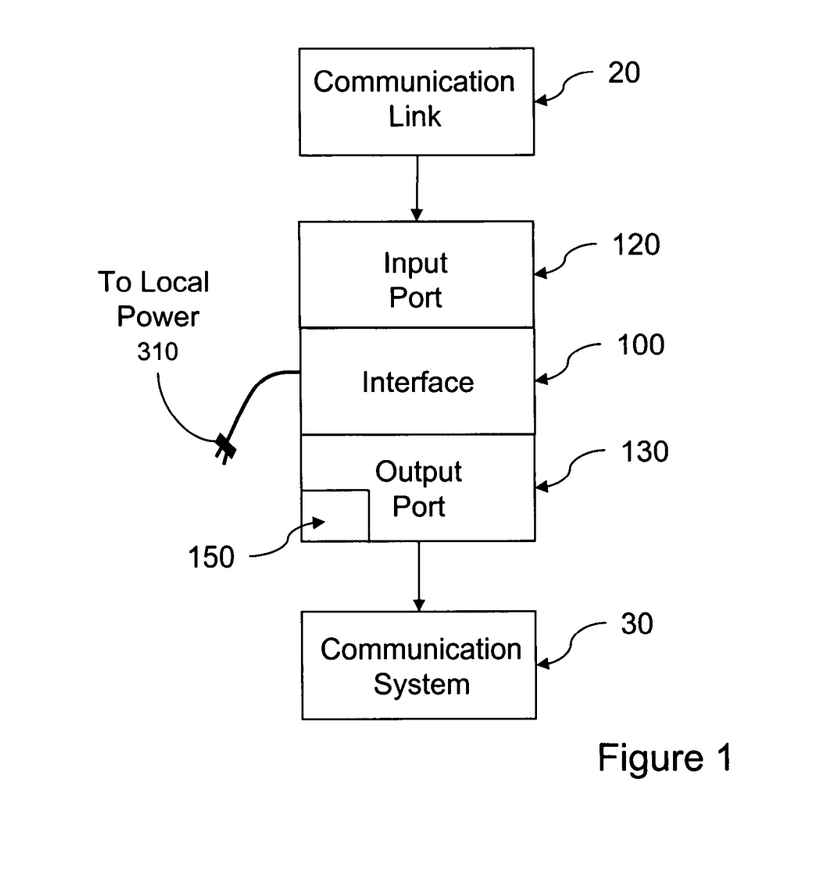
FIG. 1 illustrates an example of an apparatus provided by the present invention.

FIG. 1 illustrates a schematic of an apparatus provided by the present invention. A communication link 20, which for example could be a cable, copper wire or FTTP and terminated to an ATA, VoIP phone, FTTP phone or residential gateway or residential gateway component, is connected to an input port 120 associated with an interface 100, which for example may be a transformer or adjustable transformer. The interface may be associated with a local power source 310. Also associated with the interface 100 is an output port 130 that is connected to a communication system, for example an alarm panel and/or an alarm system. The output port 130 is connected to an off-hook detection device 150 that may sense an increase in current or a drop in voltage. Alternatively the interface 100 may contain a current monitor for sensing an off-hook condition.

Figure 2:
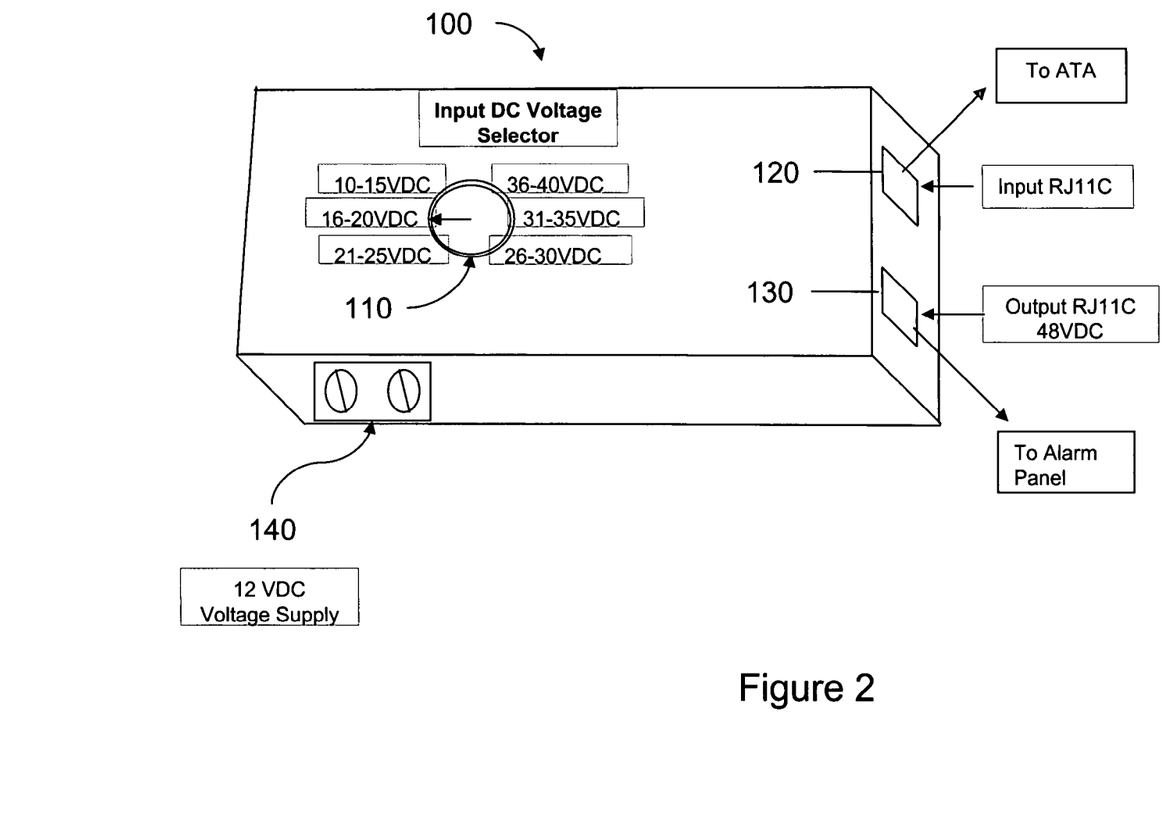
FIG. 2 illustrates an example of an adjustable transformer.

FIG. 2 illustrates an embodiment of the present invention as an Adjustable Transformer. By way of example the adjustable transformer may comprise a 48VDC voltage regulator 100 that has a variety of input range selectors 110 with built-in ring voltage protectors to prevent spikes. The "Input DC Voltage Selector" indicates several different exemplary voltage levels 110. The invention is not limited to any particular voltage or range of voltages; it will be appreciated that any voltage level input or output can be designed. Various components of CPE equipment may provide ranges of voltages that may be monitored and transformed to a range of voltages supplied to ensure proper operation of alarm systems.

The adjustable transformer 100 comprises an input port 120 that may comprise an RJ11C connector and be connectable to a CPE like an ATA. The adjustable transformer 100 also comprises an output port 130 that may comprise an RJ11C connector and be connectable to a communication system like an alarm panel. The adjustable transformer 100 may provide a signal to the alarm panel of 48 Volts indicating that a communication link is available for the alarm system to call out. The adjustable transformer 100 may also comprise a power supply 140, for example a 12 VDC voltage supply.

Figure 3:
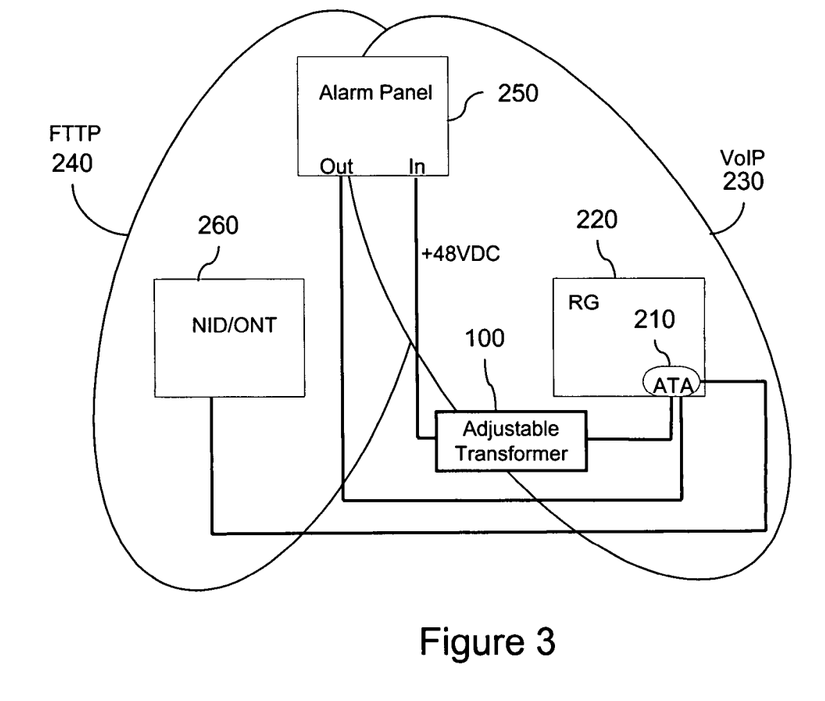
FIG. 3 illustrates various components that may comprise embodiments of the present invention.
Figure 4:
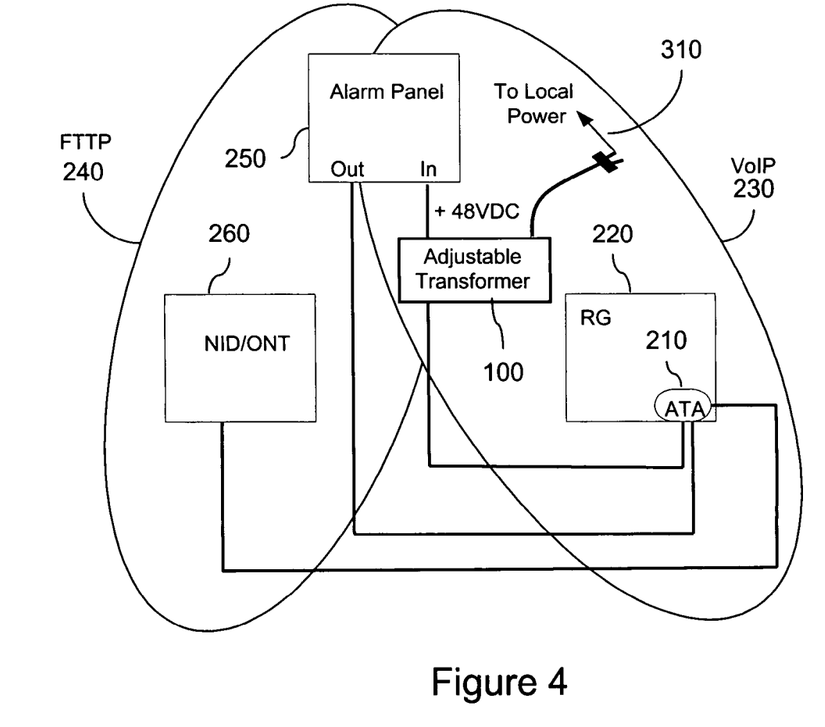
FIG. 4 illustrates various components that may comprise embodiments of the present invention.

FIG. 3 and FIG. 4 illustrate various possibilities as to where the proposed Adjustable Transformer can be installed within the end user dwelling in relation to various components of residential gateways, or other customer provided equipment (CPE).

FIG. 3 illustrates possible locations that the proposed Adjustable Transformer 100 can be installed. In FIG. 3 the Adjustable Transformer 100 is installed near the ATA 210. This may optionally allow the Phone Company's technician to install and adjust the power level appropriately on the Adjustable Transformer 100. Since the Adjustable Transformer is installed near the ATA 210, the ATA will be able to power the Adjustable Transformer; therefore, no local power is required into the Adjustable Transformer.

The ATA 210 may be part of a Residential Gateway (RG) 220. An RG may comprise, for example, additional components and software/firmware that integrate a DSL modem, a high-performance router and professional grade firewall among other components in a single unit or for components to work together as an RG. Connected to a telephone jack, the device may enable the existing telephone wires in a home to serve as the network, eliminating the need for new wiring between rooms.

For the system with the Adjustable Transformer 100 near the ATA (or RG) the VoIP system 230 comprises system components ATA 210, RG 220, Adjustable Transformer 100, Alarm Panel 250 all connected together substantially as illustrated in FIG. 2, and does not necessarily need local power since the ATA (or RG) may provide a power source. For this same or equivalent system that also comprises FTTP technology, the FTTP system 240 comprises the same system components with the addition of Network-Interface-Device/Optical-Network-Terminal (NID/ONT) component(s) 260.

FIG. 4 depicts a diagram of an alternate possible location that the proposed Adjustable Transformer 100 can be installed. In FIG. 4 the Adjustable Transformer 100 is installed near the Alarm Panel 250. This may allow the Alarm Company's technician to optionally install and adjust the power level appropriately on the Adjustable Transformer 100. In this scenario, the Adjustable Transformer 100 may require power; therefore, local power 310 or UPS will be provided.

For the system with the Adjustable Transformer 100 not close to the ATA (or RG) the VoIP system 230 comprises system components ATA 210, RG 220, Adjustable Transformer 100, Alarm Panel 250 all connected together substantially as illustrated in FIG. 3, and uses local power 310 since the ATA (or RG) may not provide a power source, or sufficient power. For this same or equivalent system that also comprises FTTP technology, the FTTP system 240 comprises the same system components with the addition of Network-Interface-Device/Optical-Network-Terminal (NID/ONT) component(s) 260.

As illustrated in FIG. 3 and FIG. 4 and described above the present invention provides for a device for providing voltage to enable an alarm panel comprising an adjustable transformer connectable between a communication link and an alarm panel wherein the transformer transforms a voltage related to the communication link to a voltage required for operation of the alarm panel and the transformer provides a predetermined voltage to the alarm panel. The communication link may include components of a residential gateway, for example a voice terminal adapter. The communication link may be a telephone or other component part of VoIP system or a FTTP communication system. An FTTP communication system may terminate at a Network-Interface-Device/Optical-Network-Terminal.

Figure 5:
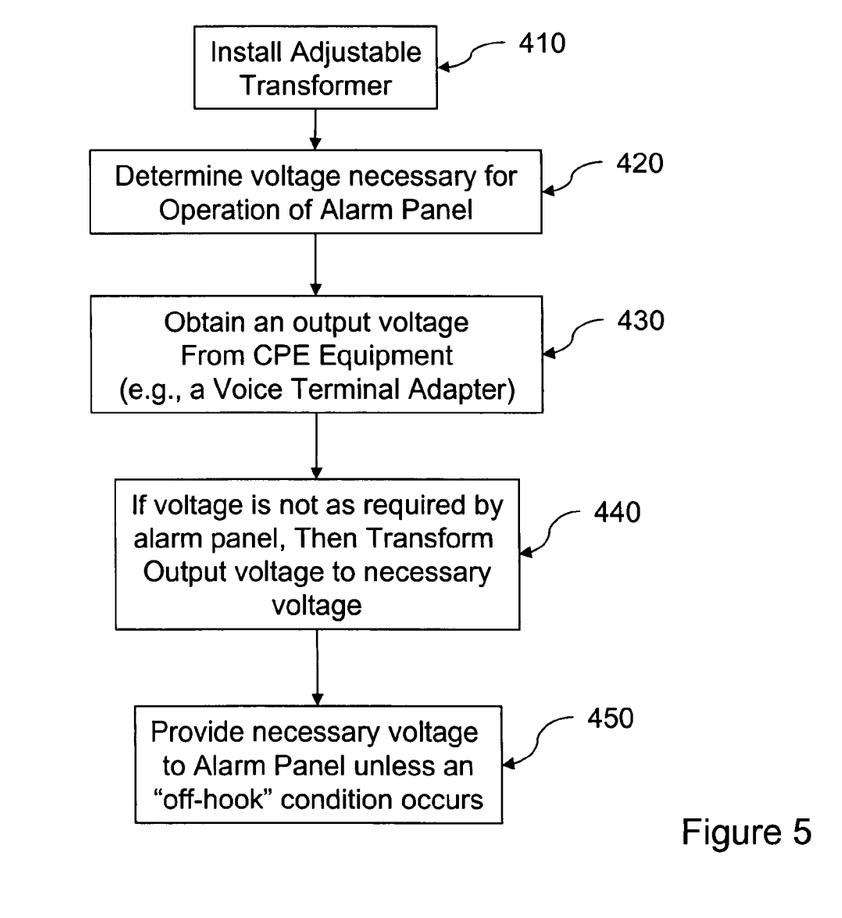
FIG. 5 illustrates a flow chart for a method provided by the present invention.

As illustrated in the flow chart of FIG. 5 the present invention provides a method for providing voltage to an alarm panel comprising installing an adjustable transformer 410, determining a voltage required for proper operation of the alarm panel 420, obtaining a voltage related to a communication link 430, transforming the voltage related to a communication link with a transformer to the required voltage 440, and providing the required voltage to the alarm panel 450. The communication link may include components of a residential gateway, for example a voice terminal adapter. The communication link may connect to a telephone or other component part of VoIP system or a FTTP communication system. An FTTP communication system may comprise a Network-Interface-Device/Optical-Network-Terminal. In one aspect the present invention provides for automatically sensing whether the output voltage of a communication link is voltage enabling proper operation of an alarm system, and automatically adjusting the voltage provided to the alarm panel.

Figure 6:
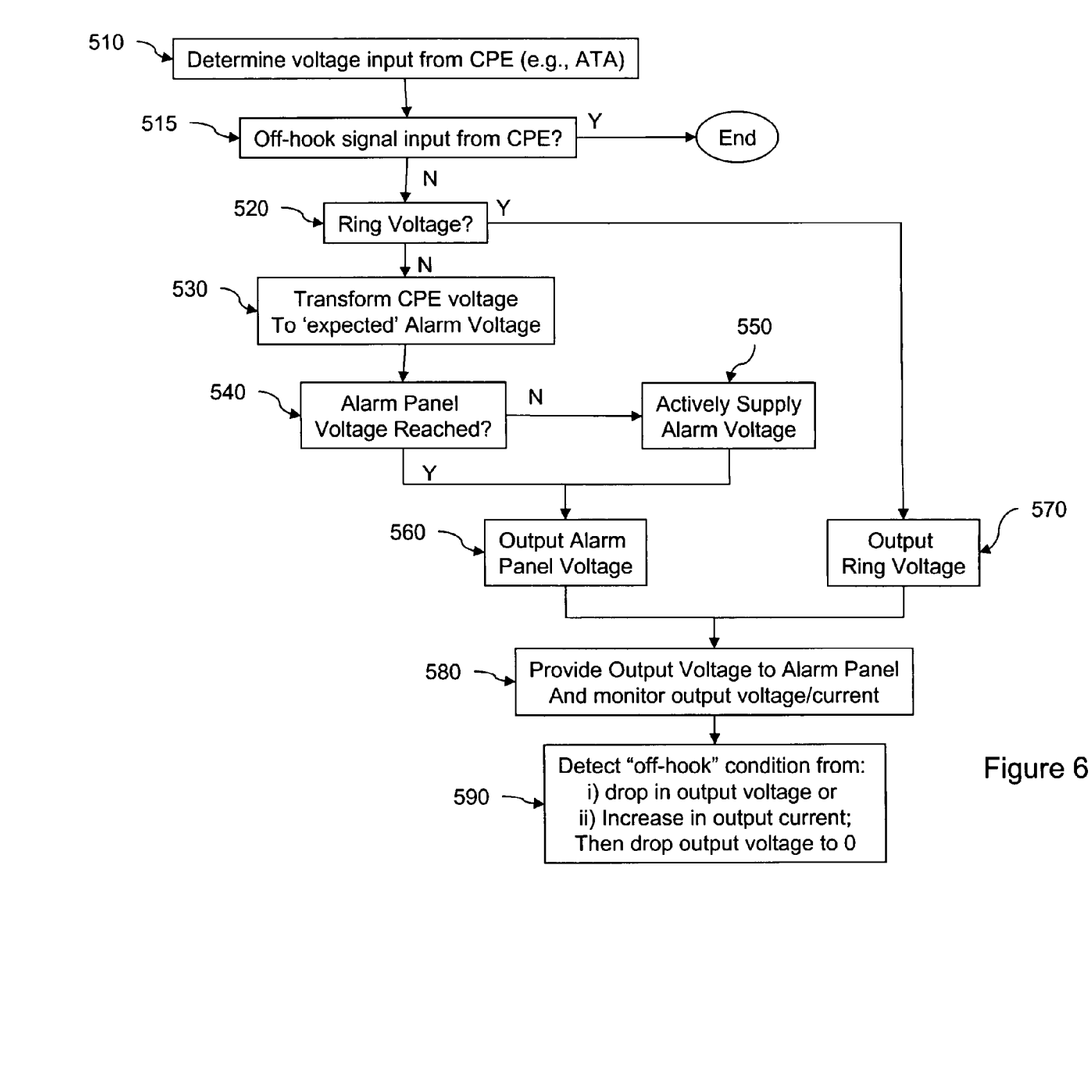
FIG. 6 illustrate a flow chart for a method provided by the present invention.

As illustrated in FIG. 6 the present invention provides a method for providing voltage or another signal to an alarm panel comprising determining a voltage input from a CPE 510, which could be an ATA. If an off-hook condition 515 is detected, the present invention may not provide the signal or voltage to the next method step. If ring voltage is present 520, which will be sensed as a spike compared to the ambient voltage input to the adjustable transformer, the ring voltage will be provided as output 570 from the transformer to the alarm panel 580. The ambient voltage output from the CPE (which voltage could be 0) is transformed to the voltage expected by the alarm panel 530 to ensure proper operation of the alarm system. If the expected or required voltage and the Alarm Panel Voltage is not attained, the adjustable transformer actively supplies the required voltage 550. As a result of transforming the voltage, the Alarm Panel voltage is output to be provided to the Alarm Panel 580. If the adjustable transformer senses a drop in the output voltage or an increase in current, which is an off-hook condition indicating a phone is in use, the voltage output to the Alarm Panel 580 is dropped to 0 (590).

The present invention provides an apparatus for providing a signal to a communication system comprising an interface between a communication link and the communication system, wherein the interface receives a signal, which may be a voltage, from the communication link and provides a conditioned signal indicative of the state of the communication link to the communication system and whether the communication link is available for use by the communication system. The communication link may be a voice terminal adapter, a residential gateway, a VoIP phone or a FTTP phone, or another component associated with a residential gateway. The communication system may comprise an alarm panel or alarm system. The apparatus also comprises an input port associated with the interface for receiving the output signal from the communication link. An output port associated with the interface provides the conditioned signal to the communication system.

The apparatus may comprise a transformer between the input port and the output port with the transformer connected to a voltage at the input port and the transformer conditions the voltage to a voltage at the output port indicative of the state of the communication link. The apparatus may also comprise a local power source, a current monitor, and diodes.

The conditioned signal provided to an alarm panel may be an alarm panel voltage or other signal indicating whether the communication link is available for use by the alarm system/panel. The apparatus provides for an off-hook signal detection wherein the conditioned signal provided to the communication system is discontinued when an off-hook condition occurs. When a ring voltage is received by the input port of the apparatus, the ring voltage is provided to the alarm panel/system.

The present invention provides a method for providing a signal from a communication link to a communication system comprising determining an output signal from a communication link, conditioning the output signal to obtain a conditioned signal indicative of the state of the communication link and providing the conditioned signal to the communication system. The conditioned signal, which may be a voltage, provided to the communication system indicates whether the communication link is available. When a fault or off-hook condition is detected, the conditioned signal is discontinued and not provided to the communication system. The fault condition or off-hook signal may be indicated by a decrease in resistance, a decrease in voltage or an increase in current.

The communication link may be a voice terminal adapter, a residential gateway, a VoIP phone or a FTTP phone. A local power source may be used to condition the output signal provided to the communication system which may be an alarm panel/system.

The present invention provides for a system and method for providing a signal to a communication system comprising an interface between a communication link and the communication system, like an alarm system, wherein the interface receives a signal from the communication link and provides a signal indicative of the availability of the communication link for use by the communication system. Alarm systems operations may be facilitated so that Residential Gateway components (such as voice terminal adapters) may simulate traditional telephone network systems that run on 48 VDC powered telephone lines. The system also comprises an input port associated with the interface for receiving the signal from the communication link, a transformer or a voltage regulator and an output port associated with the interface for providing the conditioned signal to the communication system. A ring voltage received from the communication link may be passed through to the alarm system.

Accordingly, while embodiments of the present invention have been shown and described, it is to be understood that many changes and modifications may be made thereunto without departing from the spirit and scope of the invention as defined in the appended claims.

The present invention described herein is well adapted to carry out the objects and attain the ends and advantages mentioned, as well as others inherent therein. While various embodiments of the invention have been given for purposes of disclosure, numerous changes exist in the details of procedures for accomplishing the desired results. Various modifications will be apparent to those skilled in the art. It is intended that all variations within the scope and spirit of the appended claims be embraced by the foregoing disclosure.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

What is claimed is:

1. An apparatus for outputting a status signal of a communication link, the apparatus comprising:
 a current monitor for detecting an off-hook condition; and
 an interface coupled to the communication link and including the current monitor;
 wherein the interface receives an input signal from the communication link and outputs the status signal, and further, wherein the interface includes a voltage converter for converting a voltage of the input signal to a voltage expected by a security monitoring device, and
 wherein the status signal is indicative of an availability of the communication link and includes a first magnitude when the communication link is available and, responsive to the current monitor detecting an off-hook condition, includes a second magnitude, different than the first magnitude.

2. The apparatus of claim 1, further comprising:
 an input port coupled to the interface for receiving the input signal; and
 an output port coupled to the interface for outputting the status signal.

3. The apparatus of claim 1, wherein one of the first magnitude and the second magnitude represents a magnitude of a DC voltage signal.

4. The apparatus of claim 1, wherein the first magnitude is approximately 48 VDC and the second magnitude corresponds to a ring voltage when an incoming call is received on the communication link, and wherein the interface discontinues the status signal in response to the current monitor detecting the off-hook condition.

5. The apparatus of claim 1, wherein the communication link comprises a link selected from: a telephone link, a network link, a VoIP link, and a fiber optic link.

6. A method comprising:
 receiving an input signal from a communication link;
 conditioning the input signal to obtain a status signal, wherein the status signal is indicative of an availability of the communication link; and
 outputting, by an interface coupled to the communication link, the status signal to a security monitoring device in a format expected by the security monitoring device, wherein the interface includes a current monitor for detecting an off-hook condition;
 wherein outputting the status signal includes outputting the status signal at a first magnitude when the communication link is available and outputting the status signal at a second magnitude, different than the first magnitude, when the communication link is unavailable.

7. The method of claim 6, wherein conditioning the input signal includes converting a voltage of the input signal.

8. The method of claim 6, wherein the first magnitude is approximately 48 VDC and the second magnitude corresponds to a ring voltage when an incoming call is received on the communication link.

9. The method of claim 6, further comprising:
 discontinuing the status signal responsive to the current monitor detecting the off-hook condition.

10. The method of claim 9, wherein the off-hook condition is detected in response to the occurrence of one of: a decrease in resistance, a decrease in voltage, and an increase in current.

11. The method of claim 6, wherein the communication link includes one of: a voice terminal adapter, a residential gateway, a VoIP terminal device, and an FTTP terminal device.

12. The method of claim 6, further comprising:
 conditioning, by a local power source, the input signal.

13. A system for generating a status signal, the system comprising:
 an interface for generating the status signal based on an input signal from a communication link, wherein the interface includes a current monitor for detecting an off-hook condition;
 an input port, coupled to the interface, for receiving the input signal;
 a voltage regulator, coupled to the input port, for converting an input magnitude of the input signal to an output magnitude of the status signal;
 an output port, coupled to the interface, for outputting the status signal to a security monitoring device; and
 a voltage regulator input to control the voltage regulator to produce the status signal having a first output magnitude when the communication link is available and having a second output magnitude, different from the first output magnitude, when the communication link is unavailable.

14. The system of claim 13, wherein at least one of the input magnitude, the first output magnitude, and the second output magnitude corresponds to a magnitude of a DC voltage.

15. The system of claim 13, wherein the first output magnitude is approximately 48 VDC.

16. The system of claim 13, wherein the second output magnitude corresponds to a ring voltage when an incoming connection request is received on the communication link.

17. The system of claim 13, comprising:
 an input for coupling to and receiving power from an external power source.

18. The system of claim 13, wherein the interface discontinues the status signal in response to the current monitor detecting the off-hook condition.

19. The system of claim 13, wherein the communication link comprises a link selected from: a telephone link, a network link, a VoIP link, and a fiber optic link.

* * * * *